United States Patent Office 3,260,873
Patented July 12, 1966

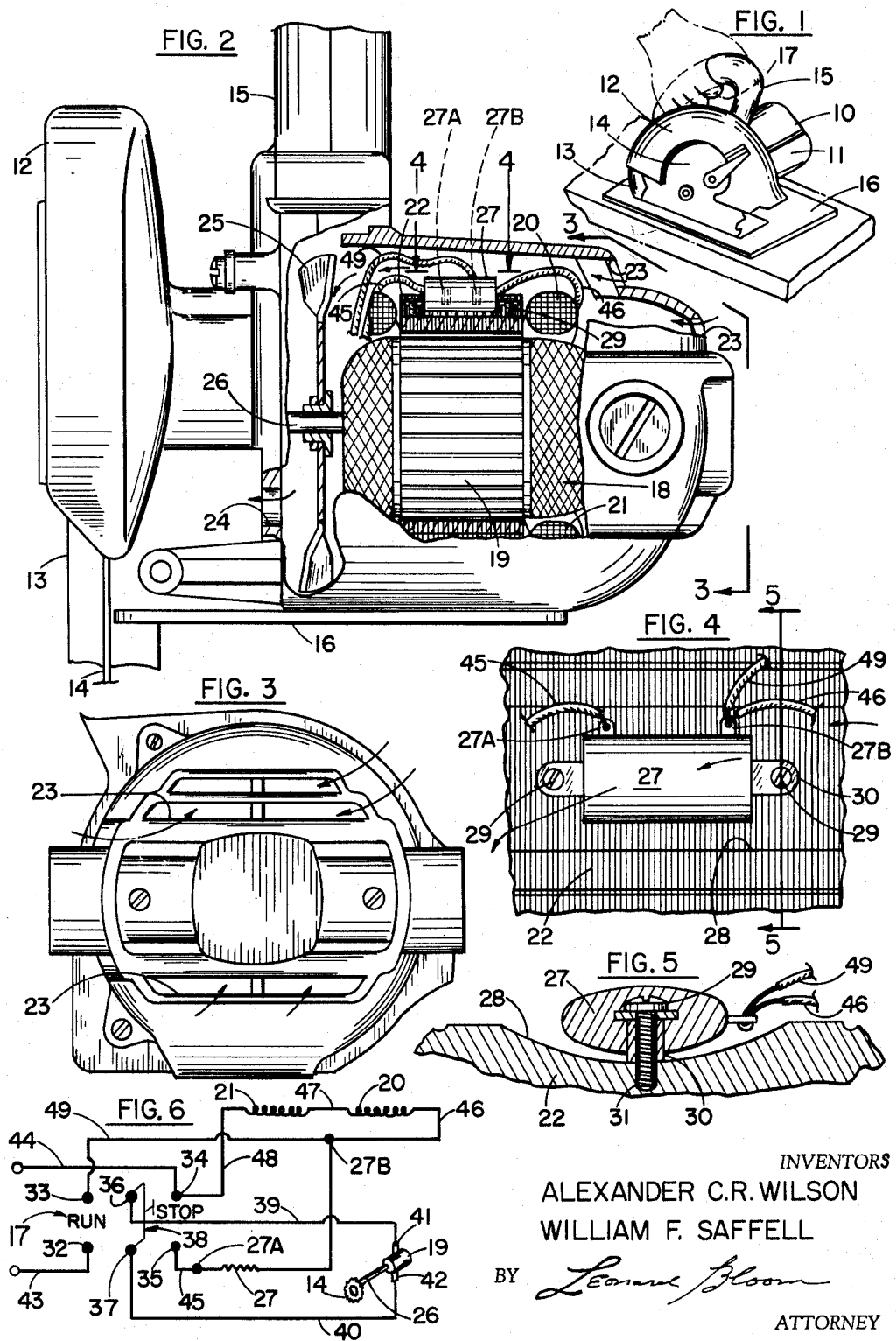

3,260,873
MOUNTING AND COOLING MEANS FOR AN
ENERGY-DISSIPATING RESISTOR IN AN
ELECTRICALLY-OPERATED DEVICE
Alexander C. R. Wilson, Towson, and William F. Saffell, Rocks, Md., assignors to The Black and Decker Manufacturing Company, Towson, Md., a corporation of Maryland
Filed Aug. 16, 1963, Ser. No. 302,539
4 Claims. (Cl. 310—62)

The present invention relates to an energy-dissipating element used in conjunction with an electrically-operated device, and more particularly, to the mounting and cooling of a dynamic braking resistor in a hand-operable portable electric tool.

It is an object of the present invention to provide a dynamic braking resistor for an automatically-applied electric brake used in conjunction with a hand-operable portable electric tool, wherein the resistor is adequately cooled by the conventional air-cooling path developed in the motor housing, and wherein the resistor does not interfere with the smooth appearance and symmetry of the motor housing.

It is another object of the present invention to provide a dynamic braking resistor which is secured within the conventional dwell formed in the core of magnetic material of the electric motor.

In accordance with the broad teachings of the present invention, there is herein illustrated and described, a means for the mounting and cooling of an energy-dissipating element used in conjunction with an electrically-operated device, comprising a housing and an electric motor in the housing, the motor including a field having a core of magnetic material. The housing has at least one air inlet opening formed therein rearwardly of the motor and at least one air exhaust opening formed therein forwardly of the motor. A fan is driven by the motor for drawing cooling air from the inlet opening, axially through the motor housing, and for discharging the air through the air exhaust opening. A resistor, which is electrically interconnected with the motor, is mounted on the core radially between the motor and the motor housing; and the resistor is disposed axially within the air-cooling path for cooling of the resistor.

In accordance with the specific teachings of the present invention, there is herein illustrated and described, a means for the mounting and cooling of a dynamic braking resistor used in conjunction with a hand-operable portable electric tool, such as a portable electric saw, comprising a substantially-cylindrical motor housing and an electric motor in the housing, the motor having a stack of field laminations formed with a dwell therein. A series of air inlet openings are formed in the housing rearwardly of the motor, and at least one air exhaust opening is formed in the housing forwardly of the motor. A fan is driven by the motor for drawing cooling air from the air inlet openings, axially through the housing, and for discharging the air through the air exhaust opening. A dynamic braking resistor, which is electrically interconnected with the motor, is disposed within the dwell and is secured therein to the stack of field laminations with a slight radial clearance therebetween. The resistor is therefore disposed radially between the motor and the housing and axially between the inlet and exhaust openings, and the cooling air passes over and around the resistor to keep it cool.

These and other objects of the present invention will become apparent from a reading of the following specification, taken in conjunction with the enclosed drawings, in which:

FIGURE 1 is a small perspective view of a typical electrically-operated device with which the teachings of the present invention may find particular utility;

FIGURE 2 is an enlarged front elevation of the device of FIGURE 1, with part of the motor housing broken away and sectioned to show the electric motor having a field core of magnetic material and an armature rotating within the field, and to further show the dynamic braking resistor secured to the core;

FIGURE 3 is a view taken along the lines 3—3 of FIGURE 2 looking rearwardly into the motor housing, and showing the plurality of air inlet openings formed therein;

FIGURE 4 is a detail plan view taken along the lines 4—4 of FIGURE 2, enlarged over the scale of FIGURE 2, and showing the dynamic braking resistor secured within the dwell of the field core;

FIGURE 5 is a section view taken along the lines 5—5 of FIGURE 4, showing the mounting of the resistor to the core; and FIGURE 6 is a schematic drawing illustrating the dynamic braking circuit.

With reference to FIGURE 1, there is illustrated a hand-operable portable electric saw 10 with which the teachings of the present invention may find particular utility; however, it will be appreciated and understood by those skilled in the art that the teachings of the present invention are equally applicable to a wide variety of electrically-operated devices having energy dissipating elements interconnected therein, and that the specific embodiment herein illustrated and described is not intended to limit the scope of the invention. With this in mind, the portable electric saw comprises a substantially cylindrical motor housing 11, a stationary upper guard 12 secured to the housing, a telescoping lower guard 13, a circular saw blade 14 driven by the motor in a conventional manner, an overhead handle 15 for guiding and controlling the saw, a shoe 16 for supporting the saw upon the surface of the material being cut, and an electric switch 17, preferably of the double-pole double-throw type, for alternately energizing and de-energizing the motor, respectively.

With reference to FIGURES 2, 3, 4, and 5, the motor housing encloses an electric motor 18 which comprises a rotating armature 19 and a field formed, preferably, by field coils 20 and 21 wound about a core of suitable magnetic material; the core may comprise a conventional stack of field laminations, denoted generally as at 22, and held together in the usual manner. While the motor herein illustrated is of the conventional "universal" type, nevertheless, it will be appreciated that other types of motor designs and constructions are entirely feasible in accordance with the teachings of the present invention. The motor housing, see FIGURE 3, has a series of air inlet openings 23 formed therein rearwardly of the motor, and the motor housing further has at least one air exhaust opening 24 formed therein forwardly of the motor. A fan 25 is driven by the motor shaft 26 for drawing cooling air (as indicated by the small arrows) from the air inlet openings, axially through the motor housing, and for discharging the air through the exhaust opening. An energy-dissipating element, such as a dynamic braking resistor 27, see FIGURES 4 and 5, is secured within the dwell 28 of the stack of field laminations by means of screws 29 which pass through respective mounting bosses 30 of the resistor and are received in respective tapped recesses 31 formed within the stack. The resistor is disposed radially between the motor and the motor housing and lies axially within the path of the cooling air, thus insuring adequate cooling of the resistor. Each of the mounting bosses, see FIGURE 5, extends below the underside of the resistor, so that the resistor will have a slight radial clearance with respect to the stack for better cooling of the resistor. This mounting of the resistor within the dwell formed on the stack of field laminations facilitates a smooth design appearance and symmetry of the motor housing; and moreover, the resistor (as well as some of its conductors) may be pre-assembled to the field core, and then the entire assembly of the field and braking resistor may be easily inserted within the motor housing and secured in the usual manner.

The electrical interconnection of the dynamic braking resistor with the motor and switch, and their mode of operation, is the subject of the co-pending Saffell application Ser. No. 295,750, filed July 17, 1963, entitled "Hand-Operable Portable Electric Tool and Electric Brake Therefor," and assigned to the assignee of the present invention. Briefly however, and with respect to FIGURE 6, the circuit is as follows: The switch 17 is of the double-pole double-throw type and comprises "run" terminals 32 and 33, "stop" terminals 34 and 35, "center" terminals 36 and 37 disposed electrically between the respective "run" and "stop" terminals, and manually-manipulatable movable contact means (denoted generally as at 38) for alternately connecting the "run" terminals with the "center" terminals in the "run" position of the switch, and for connecting the "stop" terminals with the "center," terminals in the "stop" position of the switch. A pair of conductors 39 and 40 connect the respective "center" terminals 36 and 37 with the respective electrical brushes 41 and 42 that engage the commutator (not shown) of the armature 19. The "run" terminal 32 is connected to the "hot" side of the line by means of a conductor 43, while the "return" side of the line is connected by means of a conductor 44 to the "stop" terminal 34. The other "stop" terminal 35 is connected to terminal 27a of the resistor 27 by means of a conductor 45. The other terminal 27b of the resistor 27 is connected by means of a conductor 46 to one side of the field windings, as to one side of field coil 20. The other end of field coil 20 is connected by means of a conductor 47 to the other field coil 21. The other side of the field coil 21 is connected by means of a conductor 48 to the "stop" terminal 34. Finally, a conductor 49 connects the other "run" terminal 33 with the terminal 27b of the dynamic braking resistor. When the switch 17 is positioned such that the movable contact means 38 connects the "run" terminals 32 and 33 to the "center" terminals 37 and 36, respectively, as when the switch is manually depressed, the armature 19 is placed in series with the field coils 20 and 21 for energizing the motor and driving the saw blade. However, when the switch is positioned such that the movable contact means 38 connects the "stop" terminals 34 and 35 with the "center" terminals 36 and 37, respectively, as when the switch is manually released, the armature 19 is placed in series with the field coils 20 and 21 and with the dynamic braking resistor 27, but with reversed electromagnetic polarity between the armature and the field coils, to brake the motor and the driven saw blade to a stop in a fraction of the time than would ordinarily be required were the motor and the saw blade allowed to coast to a stop.

Obviously, many modifications may be made without departing from the basic spirit of the present invention, and therefore within the scope of the appended claims, the invention may be practiced other than has been specifically described.

We claim:
1. Mounting and cooling means for an energy dissipating resistor in an electrically-operated device, comprising, in combination:
   (a) a housing;
   (b) an electric motor in said housing, said motor including a field having a core of magnetic material;
   (c) said housing having at least one air inlet opening formed therein rearwardly of said motor and at least one air exhaust opening formed therein forwardly of said motor;
   (d) a fan driven by said motor for drawing cooling air from said inlet opening, axially through said housing, and for discharging the air through said exhaust opening; and
   (e) an energy-dissipating resistor secured in a dwell formed in said core of magnetic material; said resistor being disposed radially between said motor and said motor housing, and axially within the path of cooling air for said motor, thereby providing for the mounting and cooling of said resistor.

2. In an electrically-operated device, the combination of:
   (a) a housing;
   (b) an electric motor in said housing;
   (c) said motor having a stack of field laminations formed with a dwell therein;
   (d) a resistor electrically interconnected with said motor and positioned within said dwell of said stack of field laminations; and
   (e) means to pass cooling air through said housing and around said resistor.

3. In a hand-operable portable electric tool, the combination of:
   (a) a substantially-cylindrical motor housing;
   (b) an electric motor in said housing, said motor having a stack of field laminations formed with a dwell therein;
   (c) a series of air inlet openings formed in said housing rearwardly of said motor;
   (d) at least one air exhaust opening formed in said housing forwardly of said motor;
   (e) a fan driven by said motor for drawing cooling air from said air inlet openings, axially through said housing, and for discharging the air through said air exhaust opening; and
   (f) a dynamic braking resistor electrically interconnected with said motor, disposed within said dwell, and secured therein to said stack of field laminations;
   (g) said resistor being disposed radially between said motor and said housing and axially between said inlet and exhaust openings for the cooling of said resistor.

4. The combination of claim 3, wherein:
   (a) said resistor is provided with a pair of mounting bosses, one on each side thereof and each extending below the underside of said resistor; and wherein:
   (b) said stack of field laminations is provided with a pair of tapped recesses, one for each of said bosses; and
   (c) a pair of screws are provided, one for each of said recesses, and passing through the said respective bosses to secure said resistor to said stack, the resistor having a slight radial clearance with respect to said stack for better cooling of said resistor.

References Cited by the Examiner
UNITED STATES PATENTS 1,551,752    9/1925    Kriesel _____ 310—50 X
2,064,388    12/1936    Smellie _____ 310—62

MILTON O. HIRSHFIELD, *Primary Examiner.*

ORIS L. RADER, *Examiner.*

L. L. SMITH, *Assistant Examiner.*